(No Model.)
C. L. AMES.
PNEUMATIC TIRE.
No. 517,414. Patented Mar. 27, 1894.
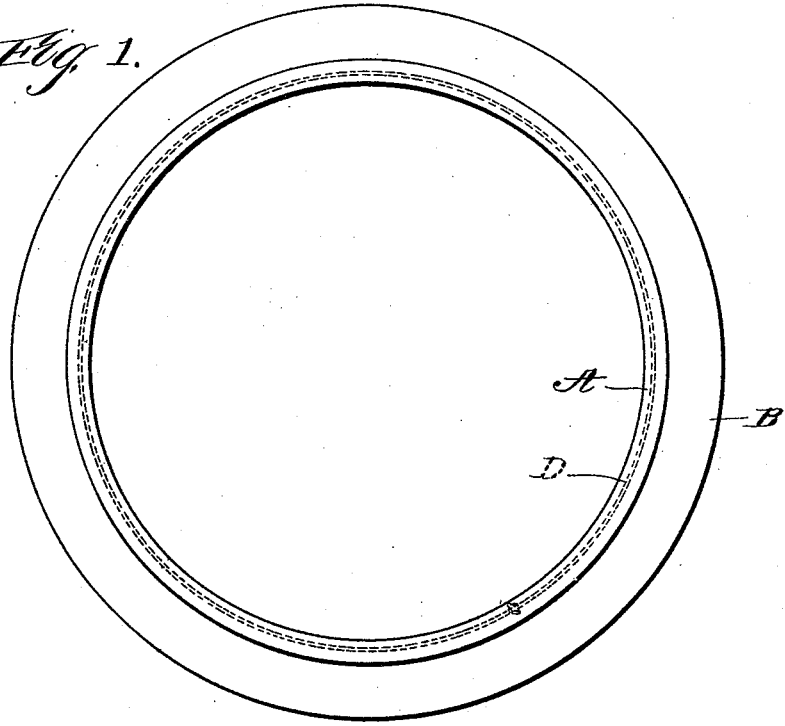
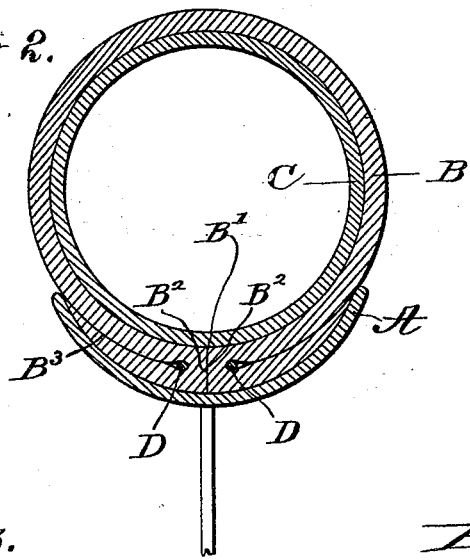
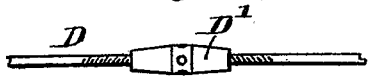
Witnesses:
Alice Limer
Ambrose Risdon
Inventor:
Charles L. Ames
by Cyrus Kehr Atty.

UNITED STATES PATENT OFFICE.

CHARLES L. AMES, OF RIDGELAND, ILLINOIS.

PNEUMATIC TIRE.

SPECIFICATION forming part of Letters Patent No. 517,414, dated March 27, 1894.

Application filed July 6, 1893. Serial No. 479,691. (No model.)

*To all whom it may concern:*

Be it known that I, CHARLES L. AMES, a citizen of the United States, residing at Ridgeland, in the county of Cook and State of Illinois, have invented certain new and useful Improvements in Pneumatic Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This improvement relates particularly to pneumatic tires in which the outer covering is open along a line extending along the middle of the seat or portion which rests in the rim of the wheel.

The object of the invention is to produce such a tire provided with efficient and convenient means for holding its edges together along said opening, the tire being at the same time of proper shape along the seat to fit into a rim which is concave in cross-section.

In the accompanying drawings: Figure 1 is a side elevation of a tire and rim embodying my improvement. Fig. 2 is a transverse section of the tire and rim. Figs. 3 and 4 are details of the means and methods of joining the ends of the binding wire.

In said drawings, A is the rim.

B is the outer tube of the tire, and C is the inner tube of the tire. Said tube, C, is to be air tight and may be of any well known form. The tube, B, is of relatively strong construction, as is usual with the construction of this tube. Along a line extending along the middle of the seat or portion lying in the rim, A, the tube, B, is open as indicated at B', all around the tire, in order that the tube, C, may be readily inserted and removed and in order that access may be had to said tube, C, at any point of the circumference of the tire. The edges, B², of the tube, B, along said opening, B', are so fitted as to adapt them to abut closely and make a tight joint when pressed together. For this purpose they are preferably formed with plane faces, as shown in the drawings. The interior of the tube, B, is preferably circular in cross-section, in order that the tube, C, may be of this form when inflated. The exterior of the tube, B, outside of the portion which is to rest in the rim, A, may be of any desired form. Along a line parallel and adjacent to the line to be occupied by the edge of the rim, said tube is gradually thickened to the middle of the seat or portion which is to rest in the rim, A. Thus said seat is curved in cross-section upon a radius approximately equal to the radius of the main portion of the tube, B, but having its center a little nearer the seat than the center of the interior of the tube, B, and is adapted to fit into a rim which is concave on a corresponding radius. Along or adjacent to said line at which said thickening begins said thickened portion of the tire is split all around and from each side of the tire and almost to the opening, B', to form slots, B³. In the portion of each of said slots, B³, near the opening, B', lies a wire or similar binder, D. Each of said wires extends around the tire and the meeting ends are joined by means of a threaded coupling, D', (see Fig. 3,) or by a twist, D², (Fig. 4.) By means of these couplings, said wires are drawn to a suitable tension to cause them to press toward each other and toward the middle of the rim, A, whereby the edges, B², are joined tightly to each other and to the middle of the portion of the concave side of the rim. The binders, D, are to be placed into position and tightened while the tire is deflated so that it may be compressed from either side to permit entrance into the adjacent slot, B³. In repairing, the tire is to be deflated and either one or both of the binders, D, removed to release either one or both edges, B², of the tube, B. It will be observed that these binders form an efficient and convenient means for uniting and separating the edges, B², of the tube, B. At the same time I am enabled to use the concave rim, which is in most general use and more simple to manufacture than other forms of rolled rim and is the strongest of all forms of rim. The peculiar form of the seat of the tube, B, affords an extended surface to be pressed into contact with the rim, A, and this coupled with the efficient means for pressing said seat upon said rim, leads to such a firm engagement between said seat and said rim as to avoid "creeping" of the tire in the rim though the tire be not cemented to said rim. Avoiding cementing is also an important consideration. It is to be observed, also, that the fastening of the tube, B, is not dependent upon the inflation of the tire. The tire may become punctured and deflated without affecting the attachment between the rim and the tube, B.

I claim as my invention—

1. In a pneumatic tire, a tube which is open along the seat and gradually thickened from near the lateral limits of the seat to the middle of the latter, and has slots, $B^3$, extending from near said edge toward the middle of said seat substantially parallel to said opening and concentric with said tube, substantially as described.

2. In a pneumatic tire, a tube which is open along the seat and gradually thickened from near the lateral limits of the seat to the middle of the latter and has slots, $B^3$, extending from said edge toward the middle of said seat substantially parallel to said opening and concentric with said tube, and binders extending into said slots for binding the edges of said tire to each other, substantially as described.

3. In a pneumatic tire, a tube which is open along the seat and gradually thickened from near the lateral limits of the seat to the middle of the latter, and has slots, $B^3$, extending from said edge toward the middle of said seat substantially parallel to said opening and concentric with said tube, and annular binders extending through the slots, $B^3$, entirely around said tire, substantially as described.

4. In a pneumatic tire, a tube which is open along the seat and gradually thickened from near the lateral limits of the seat to the middle of the latter and has the abutting edges at said opening formed with plane faces and has slots, $B^3$, extending from near said edge toward the middle of said seat substantially parallel to said opening and concentric with said tube, substantially as described.

5. In a pneumatic tire, a tube which is open along the seat and thickened at each side of said opening and has the abutting edges at said opening formed with plane faces and has slots, $B^3$, for the reception of binders, substantially as described.

In testimony whereof I affix my signature, in presence of two witnesses, this 26th day of June, 1893.

CHARLES L. AMES.

Witnesses:
CYRUS KEHR,
AMBROSE RISDON.